Dec. 11, 1928.
F. L. OHLER
1,694,663
ELEVATOR GEARING ADJUSTMENT
Original Filed Sept. 9, 1922
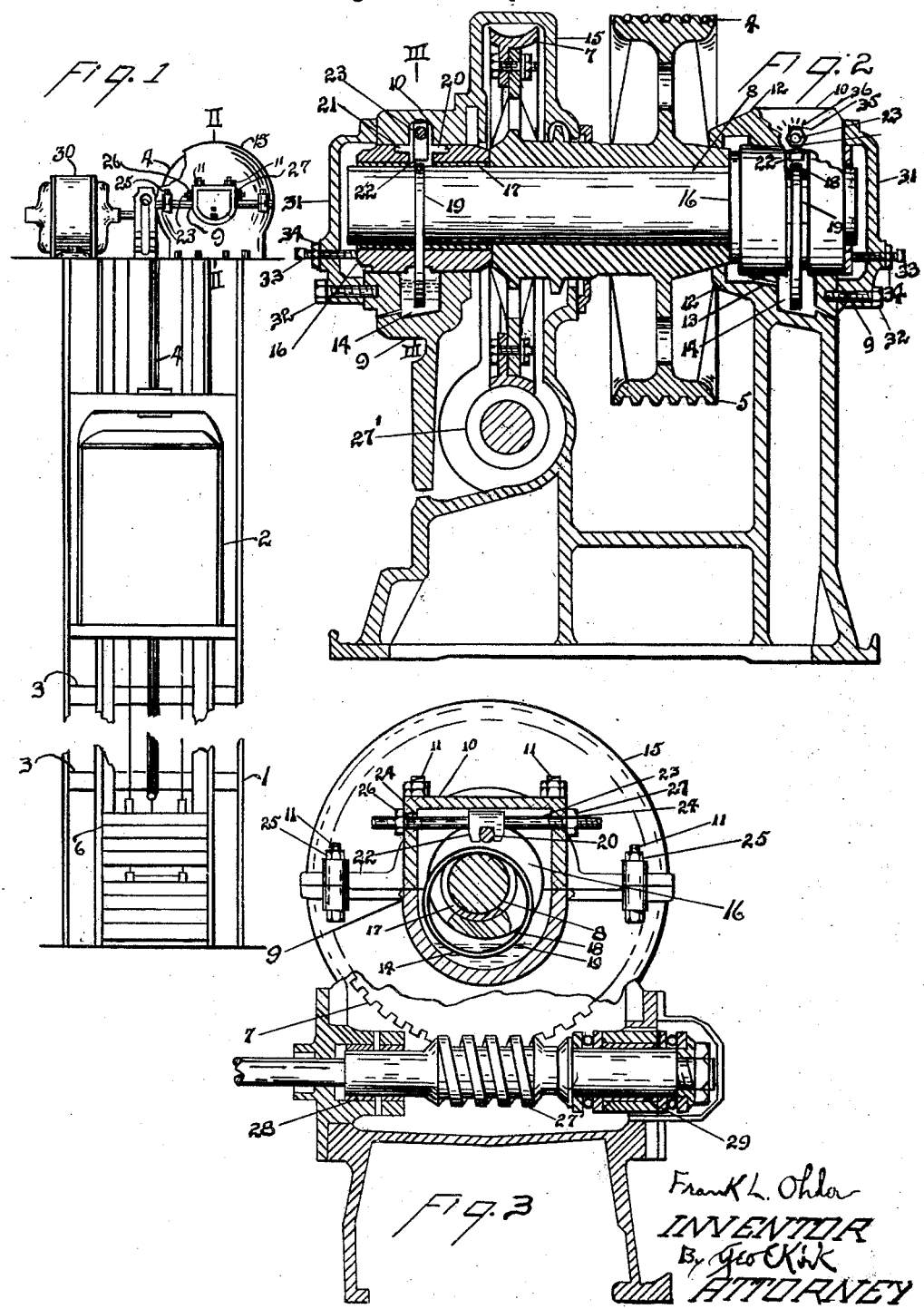
Frank L. Ohler
INVENTOR
By Geo C Kirk
ATTORNEY Patented Dec. 11, 1928.

1,694,663

UNITED STATES PATENT OFFICE.

FRANK L. OHLER, OF TOLEDO, OHIO, ASSIGNOR TO THE HAUGHTON ELEVATOR AND MACHINE CO., OF TOLEDO, OHIO, A CORPORATION OF OHIO.

ELEVATOR-GEARING ADJUSTMENT.

Continuation of application Serial No. 587,114, filed September 9, 1922. This application filed November 12, 1925. Serial No. 68,955.

This invention relates to the adjustment of shaft bearings, more especially in connection with worm gearing as used for driving elevators, with the object of securing and maintaining the gearing in proper mesh for quiet operation.

Referring to the drawings:

Fig. 1 is a view, with parts broken away, of an embodiment of the invention in connection with elevators;

Fig. 2 is a section on the line II—II, Fig. 1; and

Fig. 3 is a section on the line III—III, Fig. 2.

Elevator shaft or well 1 is shown as having elevator or car 2 for traveling up and down to different landings 3. This car 2 is sustained by hoist line 4 extending about hoisting or actuating drum 5 to counterweight 6 in the well 1.

The drum 5 is fixed with worm wheel 7 to rotate with shaft 8 in pillow blocks 9 having upper sections 10 anchored with the blocks 9 by means of bolts 11. One of these pillow blocks 9, 10, has inwardly projecting oil catching overhanging portion 12 in communication by way of duct 13 with oil reservoir 14 centrally of the pillow block. This oil retainer as to the other bearing or block is carried by housing 15 for the worm wheel 7.

The pillow blocks 9, 10, as clamped in position by the bolts 11, may snugly embrace eccentric bearing adjustment means 16, normally non-rotative or fixed. These eccentrics 16 have therein bearings 17, say of babbitt as the bearings proper for the shaft 8.

A slot 18 medially of each eccentric 16 divides the eccentric partially into halves to provide clearance for oil ring 19 to ride on the shaft 8 and thus be rotated to travel in the lubricant reservoir or oil well 14 and bring oil into the slot 18 for feeding down between the bearings 17 and the shaft 8.

Bridging this slot 18 is a pin 20, seating in recesses 21 of the opposing slot walls of the eccentric 16. A fork 22 is astride the pin 20. This fork 22 is fast with bar 23 having its threaded ends oppositely extending through openings 24 in the pillow block section 10. By slacking off nuts 25 on the bolts 11, the upper pillow block section 10 may be sufficiently freed from its clamping position as to the eccentric 16, that by loosening a nut 26 on one end of the bar 23, similar nut 27 on the opposite end of such bar 23 may be run up, thereby drawing the bar 23 and the fork 22. This action through the pin 20, may rotate the eccentric 16 to a desired angular position, when the opposing nut 26 may be tightened, and the pillow block section 10 reclamped by tightening the nuts 25 on the bolts 11.

The worm wheel 7 is in mesh with worm 27' held for fixed axis of rotation by bearings 28, 29. This worm 27' is actuated from motor 30.

Caps 31 over the outer ends of the shaft 8 are held in oil retaining position as to the pillow blocks 9, 10, by bolts 32. Bolts 33, through the caps 31 and bearing against the eccentrics 16, permit axial shifting of the shaft 8 with its worm wheel 7 and drum 5. Slacking off of one bolt 33 gives leeway for running up of the other, then each may be held by lock nut 34, as the adjusted position, say for bringing the worm wheel 7 into the plane of the worm 27, is determined as a factor for proper meshing relation in efficient quiet and smooth elevator as well as elevator gearing operation.

The bearing adjustment as herein disclosed is of material value, as a simple means, accessible at all times, even under load, as well as during machine operation. In hoisting or elevator service, renewing and adjusting bearings, involving taking the load away from the bearing, are problems of considerable delay and labor, and due to such, promotes practice of indulging therein only as a matter of extreme necessity. It is accordingly not a current matter of maintained refinement of adjustment, but one to be undertaken only when backlash is so seriously present as to cause trouble.

Renewing the gears by replacement necessity is hastened by permitting slight play or backlash to exist. Accordingly by maintaining adjustments to minimize backlash, the life of the gears is increased, and the period of usefulness of the worm is benefited thereby many fold. While the elevator is in service, and even during elevator operation, the bearing adjustments herein may occur to change the axis position of the shaft 8 as to the axis of the worm 27'. This adjustment of the bearings 17 may bring the worm 27' at all times into proper mesh relation with the worm wheel 7. As index mark 35 on the nut 26 is shifted as to graduations 36 on the block section 10, there is a convenient checking of the angular shifting of one of the eccentrics 16 for following in shifting of the companion eccentric 16 to maintain the shaft 8 in proper alignment.

In hoisting operations, as in the loading and unloading of an elevator car at a landing, whenever the load changes the unbalanced condition as to the counterweight, whether up or down, the holding worm gets a knock from rocking of the worm wheel when such change takes place. This is not only a pound on the worm wheel to shorten its life and mutilate the pitch, but there is a concussion transmitted to the installation and hurtful thereto, as well as a shift of the elevator car away from the landing. Such backlash is still more disastrously present at reversal of car travel, and it, in passenger elevator service, may be distinctly felt by the travelers in the elevator car, notwithstanding the car may have yieldable connection to the hoist line. The convenience for maintaining adjustment herein encourages engineers of operation to keep all backlash out of the worm gearing, with resultant improved quiet service and equipment advantage, while the adjustment under load brings the gearing into its actual working relations during the adjustment, with no changes from loading strain factors to be approximated. They are all there at the time and cared for automatically in the adjustments, even as to axial shifting for bringing the wheel and worm into the proper plane for meshing. Such ends are accomplished herein with a simple structure economically and effectually lubricated by a loose oil ring.

What is claimed and it is desired to secure by United States Letters Patent is:—

1. In a structure embodying a hoist line, a load and a counterweight connected to said line, a drum for actuating said line, a worm wheel for shifting the drum, a shaft for the worm wheel and drum and having oppositely disposed radially extending faces, a worm for actuating the worm wheel, and sets of bearings, one for the shaft and one for the worm, the set of shaft bearings being one adjacent one of said radially extending faces and another adjacent the other of said radially extending faces, the combination of eccentrics for mounting the shaft bearings, the said eccentrics each including a pin, a yoke for engaging each pin, threaded means operable for angularly shifting the yokes of said assembled operative structure, and additional means coacting between the eccentrics and the shaft for maintaining the eccentrics positioned as to the radially extending faces.

2. In a structure embodying a hoist line, a load and a counterweight connected to said line, a drum for actuating said line, a worm wheel, a shaft with which said drum and wheel are fixed, a worm for actuating the worm wheel, and sets of bearings for the shaft and worm, the combination of eccentrics for mounting one set of bearings, said eccentrics having intermediate slots, oil rings for the bearings disposed in said slots, eccentric engaging means in said slots, and means operable for shifting said eccentrics through action upon said engaging means of said assembled operative structure.

In witness whereof I affix my signature.

FRANK L. OHLER.